Nov. 9, 1943.  O. B. VETTER  2,333,834
RING BALANCE
Filed Oct. 6, 1941  3 Sheets-Sheet 1

INVENTOR.
Otto B. Vetter
BY Albert I. Kegan
ATTORNEY.

INVENTOR.
Otto B. Vetter
BY Albert I. Kegan
ATTORNEY.

Nov. 9, 1943.    O. B. VETTER    2,333,834
RING BALANCE
Filed Oct. 6, 1941    3 Sheets-Sheet 3

INVENTOR:
Otto B. Vetter;
BY Albert I. Kegan
ATTORNEY

Patented Nov. 9, 1943

2,333,834

UNITED STATES PATENT OFFICE 2,333,834

RING BALANCE

Otto B. Vetter, Chicago, Ill., assignor to Ring Balance Instrument Company, Chicago, Ill., a corporation of Illinois Application October 6, 1941, Serial No. 413,777

3 Claims. (Cl. 73—31)

This invention relates to improvements in ring balances, and more particularly to a ring balance constructed to permit inspection, adjustment and/or repair thereof while the instrument is functioning.

The ring-balance principle has found extensive application in the construction of metering, recording and/or controlling devices, such as flow meters, liquid level regulators, etc. A serious disadvantage of previous constructions, however, has been the inaccessability of the mechanism for purposes of inspection, adjustment and repair. Hitherto it usually has been necessary to disconnect the ring balance from the venturi or other primary instrument, to dismantle certain parts, or otherwise to interfere with the normal operation of the device, in order to accomplish the desired inspection. It readily will be appreciated that inspection is most effective when the device under examination is in normal operative condition, and that adjustment and regulation is then simpler and more precise.

It is a principal object of the present invention, therefore, to provide an improved ring balance constructed and so mounted in a protective housing that the front, side and rear thereof may be exposed without severing any connections or detaching any part of the mechanism.

Another object is to provide an instrument operating upon the ring-balance principle and having readily accessible mechanism, whereby the capacity or range of the instrument readily may be varied simply by exchanging one part for another of different dimensions.

Yet another object is to provide in combination a housing and ring-balance mechanism substantially filling said housing and arranged to be rotated in said housing through at least 90° while remaining in operative condition and normally connected to the customary accessory apparatus.

A still further object is to provide an improved ring balance of maximum simplicity, flexibility, ease of use, adjustability, and reliability.

The foregoing and such other advantages, objects, and capabilities as may appear herein or be pointed out as this description proceeds, or as are inherent in the present invention, are illustrated in the accompanying drawings, in which.

Like reference characters are used to designate similar parts in the drawings and in the description of the invention which follows.

Said drawings illustrate the invention as exemplified in a ring-balance flow meter. It it distinctly to be understood, however, that the present invention is adapted to be employed in ring-balance instruments of the most diverse kind, from which it is apparent that the instant invention has a wide field of industrial utility.

Figure 1:
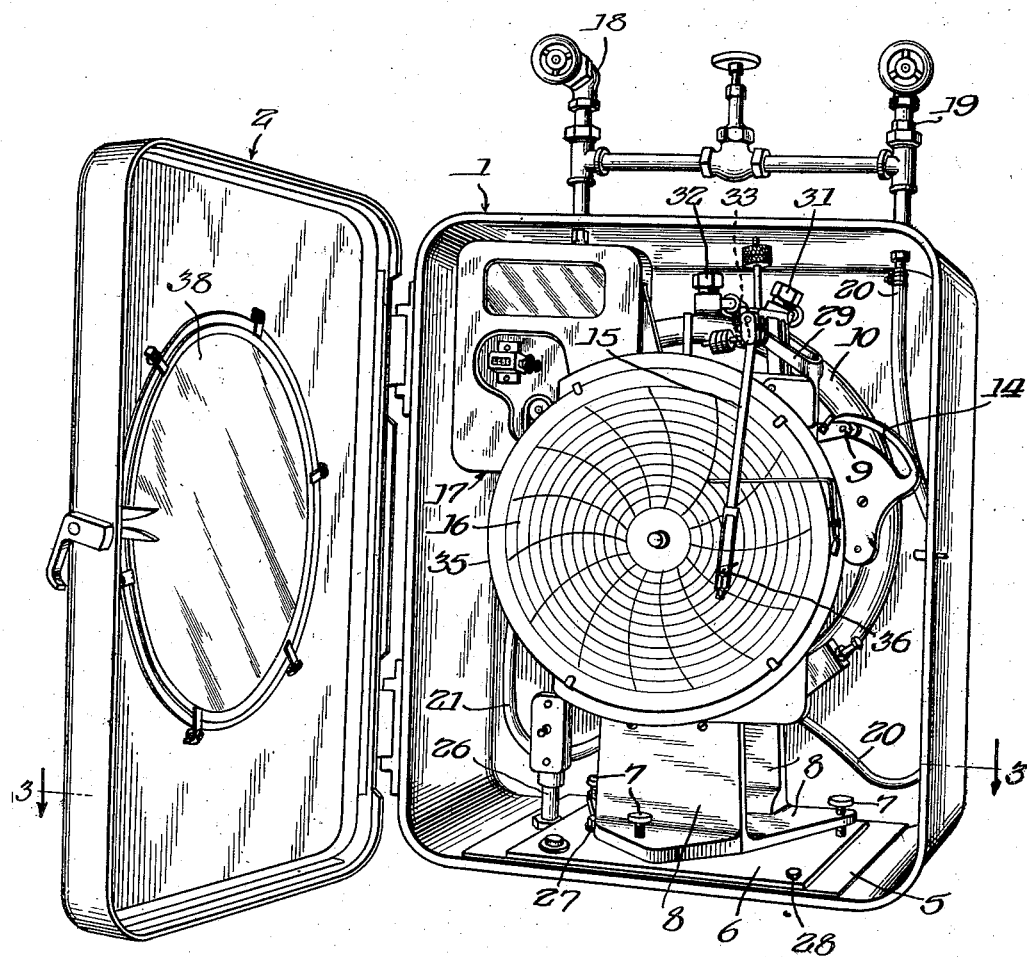
Figure 1 is a perspective front view of the interior of an instrument operating on the ring-balance principle and constructed in accordance with the present invention.
Figure 3:
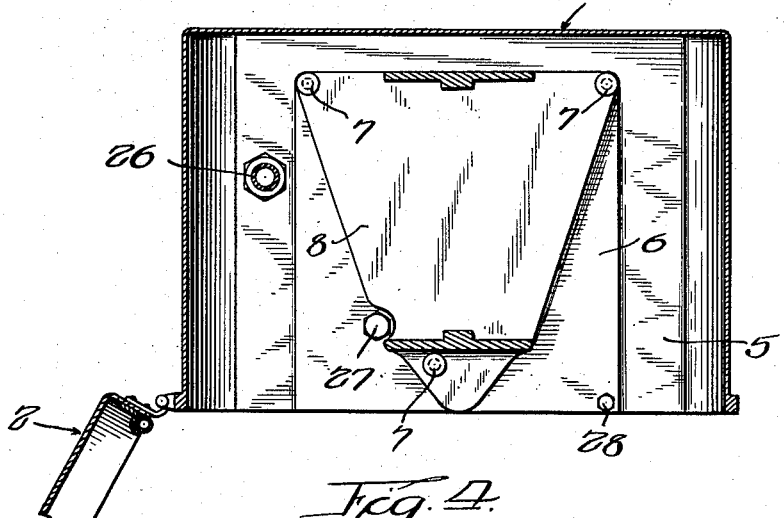
Figure 3 is a sectional plan view taken on line 3—3 of Figure 1.

Referring now more particularly to the drawings, it will be seen that the instrument illustrated includes a housing 1 provided with a hinged front panel 2 whereby access may be had to the mechanism within. Said front panel 2 is provided with a window 38 for convenience in observing the chart 16 and the integrator 17. Fastened to the floor of the housing 1 and forming a part thereof is the reinforcing plate 5. Pivotally mounted upon said reinforcing plate 5 is the swinging platform 6, which normally is positioned within the housing as shown in Figures 1 and 3. Said platform 6 is maintained in normal position within the housing 1 by means of the retaining screw 28.

Figure 2:
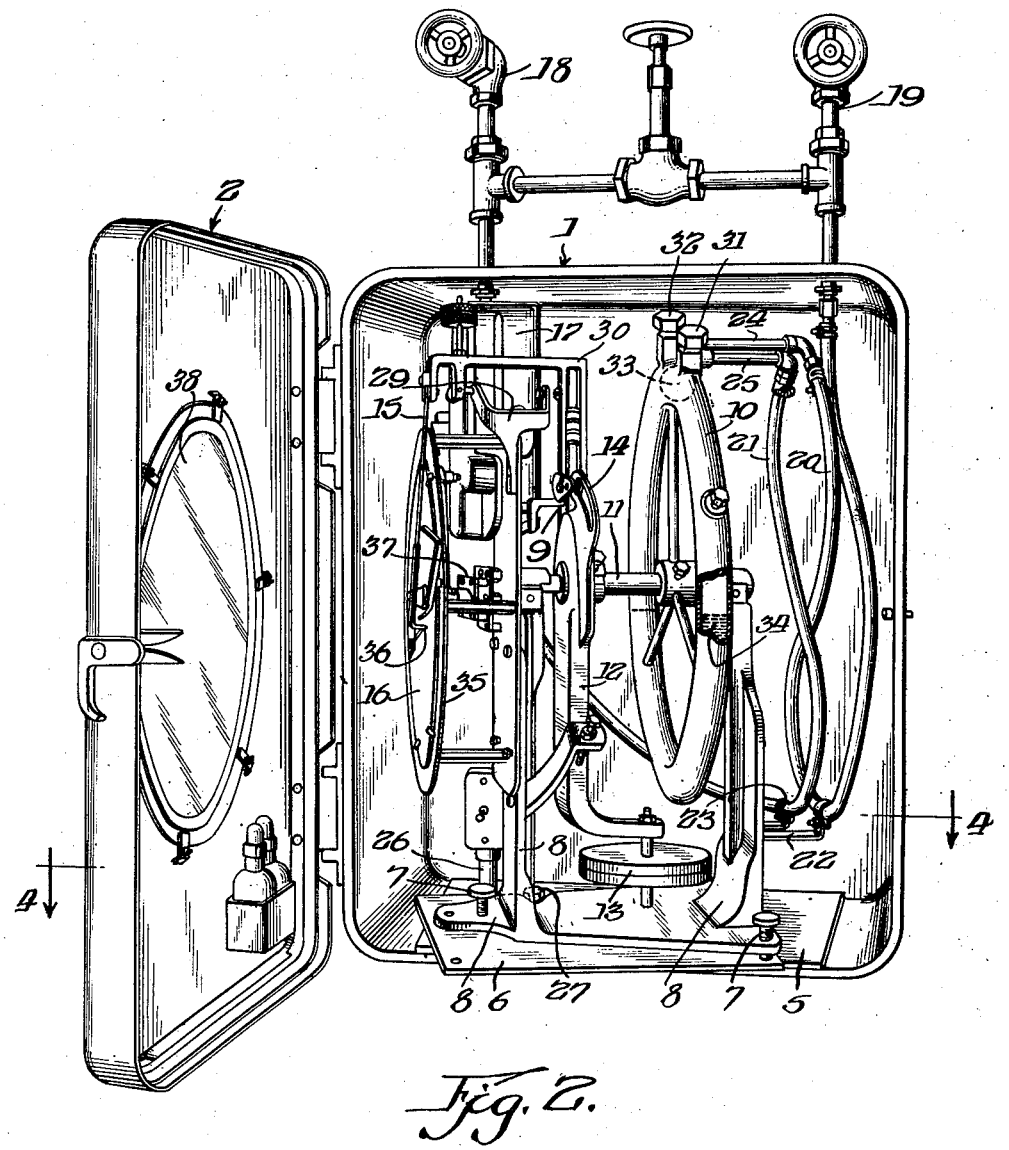
Figure 2 is a perspective front view of the same instrument in position for adjustment or repair, the mechanism being rotated and swung forward within the housing to expose the side and rear thereof.
Figure 4:
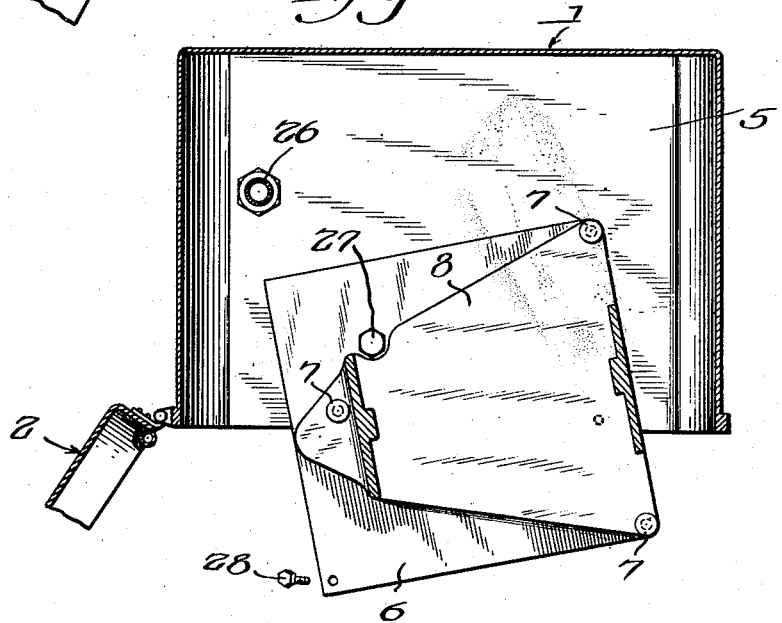
Figure 4 is a sectional plan view taken on line 4—4 of Figure 2.

Said platform turns upon the pivot 27, which is located as shown, in order that rotation of said platform may cause a portion of the same to protrude from the housing 1 in the manner illustrated in Figures 2 and 4, without removing the center of gravity of the mechanism from the cabinet. Because of this arrangement of the parts, there is no tendency for the mechanism to tilt or fall out of the housing when in the position shown in Figure 2, and the pivot 27 is subjected to little or no stress.

The support casting 8, which carries all the mechanism of the instrument, is mounted upon the platform 6 and may be adjusted by means of the leveling screws 7, 7, 7. It is this unitary mounting of the parts, together with the compact and orderly arrangement of the same, which makes it possible to swing the mechanism out of the housing without interfering with the operation of the instrument.

Rotatably supported upon the casting 8 is the shaft 11, which constitutes the axis of the ring body 10. Said ring body 10 is divided into two compartments by fluid 34 and the partition 33.

One of said compartments is connected through the valve 18, flexible tubing 21, pipe 25, and check valve 31 to the high pressure tap of the primary instrument (Pitot or Venturi tube, for example). The other compartment is connected to the low pressure tap of said primary instrument through the valve 19, flexible tubing 20, pipe 24, and check valve 32.

When the instrument is in normal position (Figure 1), the flexible tubes 20, 21 are wholly contained with the housing 1. The portion of tube 20 between the clamp 22 and the pipe 24 is maintained in S-shaped configuration, as is the portion of the tube 21 between the clamp 23 and the pipe 25. These S-shaped portions do not move relative to the ring body when the mechanism is swung into the position shown in Figure 2—only the portions of tubing between the clamps 22, 23 and the valves 18, 19 being flexed. For this reason, swinging the mechanism out of the housing produces no reaction of the tubing 20, 21 upon the ring body 10, and accordingly the operation of the instrument is not interfered with.

The ring body 10 is rigidly fastened to the shaft 11, as is the range weight and cam bracket 12 which carries the detachable and adjustable range weight 13 and the cam 14. Accordingly, angular deflection of the ring body produces an identical deflection of the bracket 12. The motion of the cam 14 is transmitted through the cam follower 9 and follower assembly 30 to the pointer or pen arm 15, and by means of suitable linkage to the integrator 17. The follower assembly 30 is pivoted upon the stirrup-shaped member 29, which in turn is fastened to the support casting 8. Also attached to the casting 8 is the chart plate 35 bearing the rotatable chart 16 upon which the pen 36 inscribes a record of the movements of the ring body 10.

Through the floor of the housing 1 passes the electric conduit 26, through which is supplied the energy necessary to operate the synchronous electric motor 37 which drives the chart plate 35 and the integrator 17.

The ring balance above described operates in the following manner:

The factor which it is desired to measure (flow of fluid, for example) is converted by the primary instrument (Pitot, Venturi tube, etc.) into a differential pressure, which is transmitted to the ring body 10 and applied to the partition 33 therein. The torque thereby created causes said ring body to rotate until said torque is counterbalanced by the torque due to the range weight 13. The angular deflection of the ring body from its zero position is a direct measurement of the differential pressure or net force applied to the partition 33. The cam 14 converts this deflection into a displacement directly proportional to the factor under measurement. This latter displacement is recorded upon the chart 16 and also is periodically transmitted to the integrator 17 and there summated with respect to time.

As is apparent from Figure 1, access to the front portions of the mechanism is had simply by opening the door 2. Access to all other portions of the device is obtained by removing the retaining screw 28 and swinging the platform 6 forward, thus exposing the mechanism in the manner illustrated in Figure 2. With the mechanism in this position, the range weight 13 readily may be removed and replaced by another of different mass whenever it is desired to use the instrument in another range of pressure or differential head.

The construction and arrangement of parts disclosed herein enables the device to function normally in the position shown in Figure 2, as well as in the position shown in Figure 1. This is a tremendous advantage, for it makes it possible to inspect and adjust every part of the mechanism while the same is in operation. Furthermore, the mechanism may be swung back into normal position within the housing with full confidence that the instrument will continue to function as it did while under inspection, because the relative position and/or adjustment of parts is in no way affected by rotation of the platform 6.

Thus it will be seen that I have fully disclosed a new and improved construction for ring balances, characterized by simplicity, sturdiness, compactness and balance, and adapted to be inspected and adjusted in the simplest manner imaginable.

Having thus described my invention and illustrated its utility, I claim:

1. The combination with a ring balance rotatable upon horizontal ways, and flexible tubing transmitting fluid under pressure to said ring balance, of housing comprising a cabinet open on one side, a door to close said cabinet, and a swinging base supporting said ring balance, said base being slidably secured by, and rotatable about, a pivot positioned eccentrically upon the floor of said cabinet, whereby said ring balance may be swung while in operation through the open side of said cabinet to expose its side and rear without introducing error due to reaction of said tubing or tilting of said ways.

2. The combination with a ring balance, of housing consisting of a cabinet open on one side, a door to close said cabinet, and a swinging base movable about a pivot situated in the floor of said cabinet between the center of said floor and the edge to which said door is fastened, said ring balance being so positioned upon said swinging base that said ring balance may be exposed through the open side of said cabinet without removing the center of gravity thereof from said cabinet.

3. In combination with a ring balance or the like, a housing consisting of a cabinet open on one side, a panel hinged thereto and adapted to close the same, a pivot in the floor of said cabinet between the center of said floor and the edge to which said panel is fastened, a plate upon said cabinet floor for supporting said ring balance or the like, said plate being rotatably secured to said pivot and adapted to slide over said cabinet floor to spin said ring balance or the like without tilting the same, thereby exposing the side and rear thereof through the open side of said cabinet without causing said ring balance or the like to register incorrectly, and means for locking said plate in normal position inside said housing.

OTTO B. VETTER.